United States Patent
McGhee

(10) Patent No.: US 12,214,295 B2
(45) Date of Patent: Feb. 4, 2025

(54) SOLVENT-EXTRACT FILTER APPARATUSES AND METHODS

(71) Applicant: Gene Pool Technologies, Cherry Hills Village, FL (US)

(72) Inventor: David McGhee, Monument, CO (US)

(73) Assignee: Gene Pool Technologies, Inc., Cherry Hills Village, CO (US)

( * ) Notice: Subject to any disclaimer, the term of this patent is extended or adjusted under 35 U.S.C. 154(b) by 513 days.

(21) Appl. No.: 17/453,291

(22) Filed: Nov. 2, 2021

(65) Prior Publication Data
US 2023/0139489 A1    May 4, 2023

(51) Int. Cl.
*B01D 11/02* (2006.01)
*B01D 29/56* (2006.01)
*B01D 46/00* (2022.01)

(52) U.S. Cl.
CPC ...... *B01D 11/0284* (2013.01); *B01D 11/0219* (2013.01); *B01D 29/56* (2013.01); *B01D 46/0005* (2013.01)

(58) Field of Classification Search
CPC ............. B01D 11/0284; B01D 11/0219; B01D 29/56; B01D 46/0005; B01D 24/008; B01D 24/18; B01D 11/02; B01D 11/028; B01D 11/0292; B01D 24/007; B01D 24/56; B01D 29/58; B01D 35/18; B01D 36/00; B01D 37/00; B01D 29/96; B01D 33/41
See application file for complete search history.

(56) References Cited

U.S. PATENT DOCUMENTS

| | | | |
|---|---|---|---|
| 3,483,984 A * | 12/1969 | Wolkenhauer | B01D 21/0012 210/167.04 |
| 4,409,104 A | 10/1983 | Schroder et al. | |
| 11,015,841 B2 | 5/2021 | Barot et al. | |
| 2011/0306801 A1 | 12/2011 | Schucker | |
| 2016/0091226 A1* | 3/2016 | Buese | F25B 13/00 422/284 |

(Continued)

FOREIGN PATENT DOCUMENTS

WO    9517939 A2    7/1995
WO    2020124203 A1    6/2020

OTHER PUBLICATIONS

International Search Report and Written Opinion from related application PCT/US22/78764.

*Primary Examiner* — Joseph W Drodge
(74) *Attorney, Agent, or Firm* — Daniel C. Pierron; Widerman Malek PL

(57) ABSTRACT

A filter apparatus includes an elongated housing with a filter input port to the housing and a filter output port to the housing. A mixture flow path is defined within the housing and extends from the filter input port to the filter output port such that the filter input port is in fluid communication with the output port through the mixture flow path. Two or more filter medium receiving volumes are defined within the housing along the mixture flow path, each filter medium receiving volume configured to receive a filter medium and contain the filter medium in the respective filter medium receiving volume. The filter medium receiving volumes are arranged within the housing such that a total length of the filter medium receiving volumes along a housing longitudinal axis is longer than the length of the housing along the housing longitudinal axis defined by the housing.

17 Claims, 6 Drawing Sheets

(56) References Cited

U.S. PATENT DOCUMENTS

| | | | |
|---|---|---|---|
| 2017/0326472 A1* | 11/2017 | McGhee | C11B 1/108 |
| 2019/0143246 A1 | 5/2019 | Ko | |
| 2020/0196656 A1* | 6/2020 | Wasserman | C11B 1/10 |
| 2020/0197842 A1* | 6/2020 | Loehl | B01D 46/0097 |
| 2020/0207654 A1* | 7/2020 | Carew | C02F 11/143 |
| 2020/0261824 A1* | 8/2020 | Pal | B01D 37/00 |
| 2021/0308604 A1 | 10/2021 | Foster | |

* cited by examiner

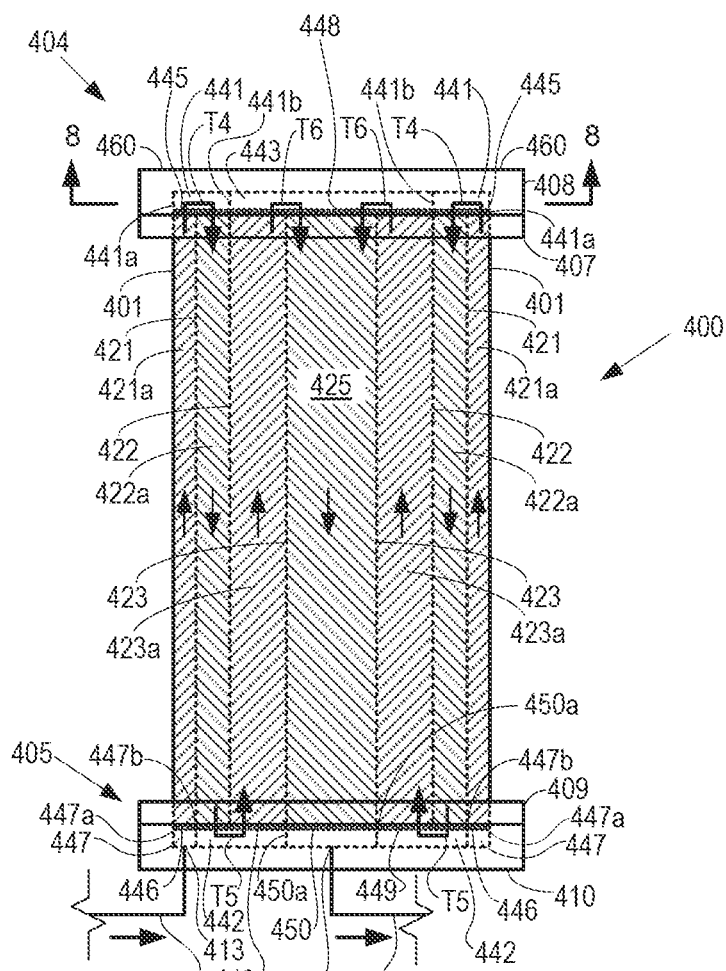
FIG. 7
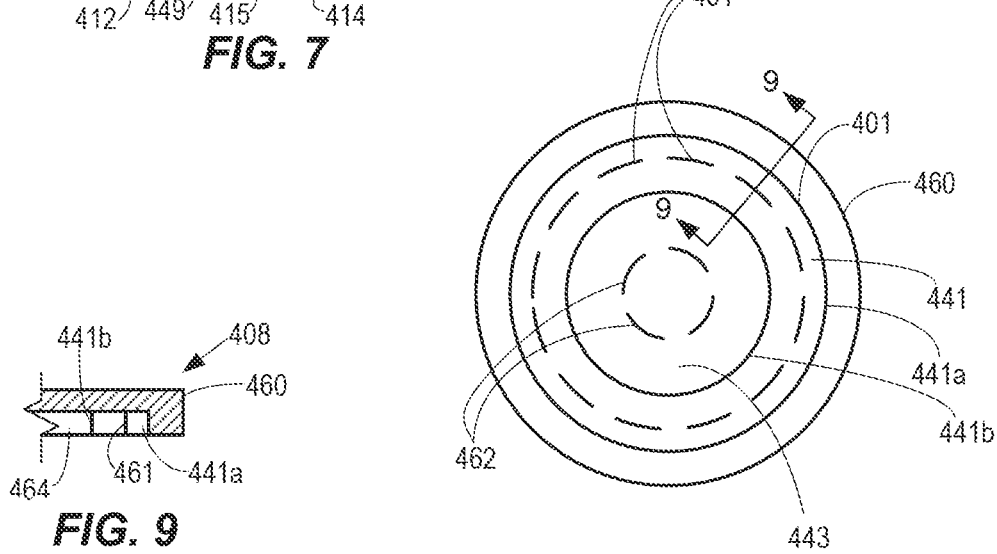
FIG. 9
FIG. 8

SOLVENT-EXTRACT FILTER APPARATUSES AND METHODS

TECHNICAL FIELD OF THE INVENTION

The invention relates to filtering fluids and particularly solvent-extract mixtures produced by an extraction process. Filtering apparatuses may be employed for removing, for example, tars, tannins, fats, (plant-derived) waxes, chlorophyll, water, and/or other components from a solvent-extract mixture.

BACKGROUND OF THE INVENTION

The processes and apparatuses utilized for solute extraction from some starting material typically place the starting material in contact with a suitable solvent, and then collect the resulting solvent-extract mixture. Such solvent-based extraction may be applied, for example, to extract an oil from animal or plant-derived material and/or other substances (e.g., synthetic substances, pharmaceutically active substances derived from fermentation and/or biosynthesis).

Biomass extraction may include the extraction of terpenoids, flavors, fragrances and/or (possibly other) pharmaceutically active ingredients from materials of natural origin. Examples of biomass materials include but are not limited to flavorsome or aromatic substances such as hops, coriander, cloves, star anise, coffee, citrus peels, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable from plant material, a cell culture or a fermentation broth, for example.

Biomass also may include, but are not limited to terpenoids (e.g., cannabinoids and terpenes), flavonoids, and/or other components from (1) Cannabis, hemp, and/or derivatives thereof (e.g., hash, sift, kief, and rosin, among other examples) and (2) other botanical substances such as terpenoid-bearing plants and/or fruits and/or extracting psilocin, baeocystin, and/or norbaeocystin from psilocibe mushrooms and/or derivatives thereof.

Example solvents include carbon dioxide, hydrocarbon(s), ethanol and mixture thereof. For example, a hydrocarbon solvent may include at least one of Isobutane, N-Butane, and/or propane. Other possible solvents may include the family of solvents based on organic hydrofluorocarbons. Solvents may be a liquid, gas, and/or subcritical or supercritical fluid within an extraction system component. Solvents may change phases within an extraction cycle, such as being in gas phase during a solvent removal step and a liquid phase during an extraction step.

There are known techniques for "post-processing" a "raw" solvent-extract mixture including processes for removing solvent(s), lipids, waxes, and/or fats and thereby producing a filtered solvent-extract mixture (sometimes referred to as "polishing" a mixture). Known techniques include employing cooled in-line de-waxers and various types of filter apparatuses for removing certain components from a solvent-extract mixture. Filter apparatuses include devices that include some type of filter medium which is capable of capturing the components to be removed from the solvent-extract mixture as the solvent-extract mixture passes through the filter medium. The resulting effluent or filtrate from the filter apparatus includes at least a reduced content of the components to be removed.

The above systems, methods, and techniques may be improved upon and examples of new and useful systems and methods that are relevant to the needs in the field are discussed below.

SUMMARY OF THE INVENTION

It is an object of the invention to provide filter apparatuses and methods for filtering particularly solvent-extract mixtures in a space-efficient and otherwise desirable manner. It is also an object of the invention to provide an extraction system employing such filter apparatuses and methods.

A filter apparatus according to a first aspect of the present invention includes an elongated housing with a filter input port to the housing and a filter output port to the housing. A mixture flow path is defined within the housing, that is, within a volume defined by the housing, and extends from the filter input port to the filter output port such that the filter input port is in fluid communication with the output port through the mixture flow path. Two or more filter medium receiving volumes are defined within the housing along the mixture flow path, each filter medium receiving volume configured to receive a filter medium and contain the filter medium in the respective filter medium receiving volume. The filter medium receiving volumes are arranged within the housing such that a total length of the filter medium receiving volumes along a housing longitudinal axis is longer than the length of the housing along the housing longitudinal axis defined by the housing. This arrangement of flow path and filter medium receiving volumes within the housing according to this first aspect of the invention has allows a desired filtering of an input fluid to be performed in a very space-efficient manner. This space-efficient filtering in turn allows a desirable layout of a given system in which the filtering apparatus is used, such as a solvent-based extraction system, for example.

Implementations according to this first aspect of the invention may configure the filter medium receiving volumes so as to define a number of longitudinal path sections of the mixture flow path. In these implementations a first such longitudinal path section defines a first flow direction along the housing longitudinal axis from the filter input port and a second longitudinal path section defines a second flow direction along the housing longitudinal axis that is opposite to the first flow direction. The mixture flow path here also includes at least one transverse path section that is oriented transversely to the housing longitudinal axis. In particular, a transverse path flow section connects the first and second longitudinal path sections. The first and second longitudinal flow path sections, and other longitudinal flow path sections may extend parallel to the housing longitudinal axis. Such as series of parallel longitudinal flow path sections may be formed within the housing using a hollow cylinder which may be concentrically positioned within the housing so as to extend parallel to the housing longitudinal axis. In this arrangement of a hollow cylinder mounted in the housing, one longitudinal path section is formed along the external surface of the hollow cylinder while another longitudinal path section is defined along the internal surface of the hollow cylinder. A number of such cylinders of different diameters may be similarly included in the housing to define additional longitudinal path sections.

In embodiments where a hollow cylinder is included within the housing for defining or cooperating to define portions of the flow path through the housing, a suitable aperture may extend through the cylinder wall to provide at least a portion of one of the transverse path sections connecting two longitudinal path sections. Such an aperture may be included at or near a longitudinal end of the hollow cylinder within the filter apparatus housing.

A filter apparatus in accordance with this first aspect of the invention may include a removeable end cover configured to be placed in an operating position at one end of the housing. Such a removable end cover may be used to define a surface along the flow path through the housing. In particular, such an end cover may define an end surface of one or more of the longitudinal path sections. In some cases, such an end cover may define at least a portion of one of the transverse path sections. In any case, the removable end cover may be removed as desired to provide access to the volume defined by the housing. Such access may be desirable for the placement of one or more hollow cylinders within the housing for defining the longitudinal path sections and for placing filter medium in the filter medium receiving volumes or removing spent filter medium.

A filter apparatus in accordance with the first aspect of the invention may include at least one thermal element that is thermally coupled to at least one of the filter medium receiving volumes. As used in this disclosure and the accompanying claims a "thermal element" may comprise any device or arrangement of devices operable to heat or cool any material included in a respective filter medium receiving volume, including a filter medium received in the filter medium receiving volume and solvent-extract mixture as it passes through the filter medium and filter medium receiving volume. Examples of such thermal elements will be described below in connection with the example embodiments shown in the drawings.

Embodiments of a filter apparatus in accordance with the first aspect of the invention may also include filter medium received in the various filter medium receiving volumes defined along the flow path from the housing inlet port to housing outlet port. Each one of the different filter medium receiving volumes may receive a dissimilar filter medium or each may include the same filter medium. Any combination of filter media may be used along the flow path within the various filter medium receiving volumes. As used in this disclosure and the accompanying claims a "filter medium" may comprise any material that is adapted to allow certain components of a fluid to pass therethrough while blocking or trapping other components from the fluid. Example filter media may include one or more of zeolites, porous glass, active carbon, clays, silicon dioxide, and mesoporous silica. Another possible advantage is selecting different filter media that resides along the same or different fluid path sections. Dissimilarities can include differences in the filtering media materials, average particle size, and/or average pore size. Filter media may include media that is commonly referred to as a molecular sieve, which may function at a molecular level to capture molecules of a certain size or shape. Molecular sieves may be used as desiccants (e.g., activated charcoal or silica gel absorbent media) among other applications.

A second aspect of the invention, comprises an extraction system that includes a filter apparatus in accordance with the first aspect of the invention. Such an extraction system includes an extraction arrangement operable for placing a solvent in contact with a starting substance to produce a solvent-extract mixture. The filter input port as described above is operably connected to the extraction system for receiving the solvent-extract mixture, and a filtrate receiving system is operably coupled to the filter output port for receiving the solvent-extract mixture from the filter apparatus for further processing.

Another aspect of the invention encompasses methods for removing at least one component from a solvent-extract mixture. A method in accordance with this third aspect of the invention may include receiving the solvent-extract mixture at an input port of an elongated housing and causing the solvent-extract mixture to flow from the filter input port through a first filter medium contained in a first filter medium volume defined along a mixture flow path within the elongated housing. The method may also include causing the solvent-extract mixture to flow from the first filter medium volume to a second filter medium volume defined along the mixture flow path and through a second filter medium contained in the second filter medium volume. The combined lengths of the first filter medium volume along a housing longitudinal axis and the length of the second filter medium volume along the housing longitudinal axis is greater that the length of the housing along the housing longitudinal axis. A method in accordance with this third aspect of the invention may finally include causing the solvent-extract mixture to flow from the second filter medium volume to an output port of the housing.

As used in this disclosure and the accompanying claims a step of "causing" a particular flow of material may be accomplished in any fashion suitable for the given material. Any technique of applying a motive force to induce the described flow may be used. Such techniques may include pumping, applying a vacuum, thermal processes, displacement with a displacing fluid, gravity flow, or any other technique.

Regardless how the flow is induced, the solvent-extract mixture may flow through the first filter medium in a first direction with respect to the housing longitudinal axis and then through the second filter medium in a second direction with respect to the housing longitudinal axis opposite to the first direction. Causing the solvent-extract mixture to flow from the first filter medium volume to the second filter medium volume may include causing the solvent-extract mixture to flow along a first transverse path section in a direction transverse to the housing longitudinal axis. This first transverse path section may include an aperture in a hollow cylinder mounted concentrically within the housing and separating at least some of the first filter medium volume from the second filter medium volume. The first transverse path section may also or alternatively include a volume defined within an end cover of the housing.

Methods according to this third aspect of the invention may also include causing the solvent-extract to flow through at least one additional filter medium volume containing additional filter medium. For example, causing the solvent-extract mixture to flow from the second filter medium volume to the output port of the housing may include causing the solvent-extract mixture to flow through a third filter medium contained in a third filter medium volume defined along the mixture flow path. This flow through the third filter medium may be in the same direction relative to the housing longitudinal axis as a flow direction through the first filter medium and opposite to a flow direction through the second filter medium. Similarly to the flow from the first filter medium volume to the second filter medium volume, the solvent-extract mixture flow from the second filter medium volume to the third filter medium volume may occur at least in part through a second transverse path section in the direction transverse to the housing longitudinal axis.

Methods in accordance with this third aspect of the invention may thermally drive solvent or mixtures thereof to flow through a filter medium and/or through extraction system components. Methods in accordance with this third aspect of the invention may also thermally regulate solvent or mixtures thereof in addition to any thermal driving. In some example embodiment implementations of this aspect, the entire extraction cycle may be thermally driven via temperature differentials between extraction system components and avoid using a pump for causing or assisting a solvent or mixture thereof to flow.

These and other advantages and features of the invention will be apparent from the following description of representative embodiments, considered along with the accompanying drawings.

FIG. 7 is a somewhat schematic side view similar to FIG. 4 but showing an alternate arrangement of internal elements for the filter apparatus.

FIG. 8 is a somewhat schematic section view taken along line 8-8 in FIG. 7

FIG. 9 is section view along ling 9-9 in FIG. 8.

DESCRIPTION OF REPRESENTATIVE EMBODIMENTS

In the following description FIGS. 1, 2, and 11 will be referenced to describe an extraction system in which solvent-extract filter apparatuses and methods in accordance with one or more aspects of the invention may be used. FIGS. 3-10 will then be referenced to describe the solvent-extract filter apparatuses and methods and various features of such apparatuses and methods.

Figure 1:
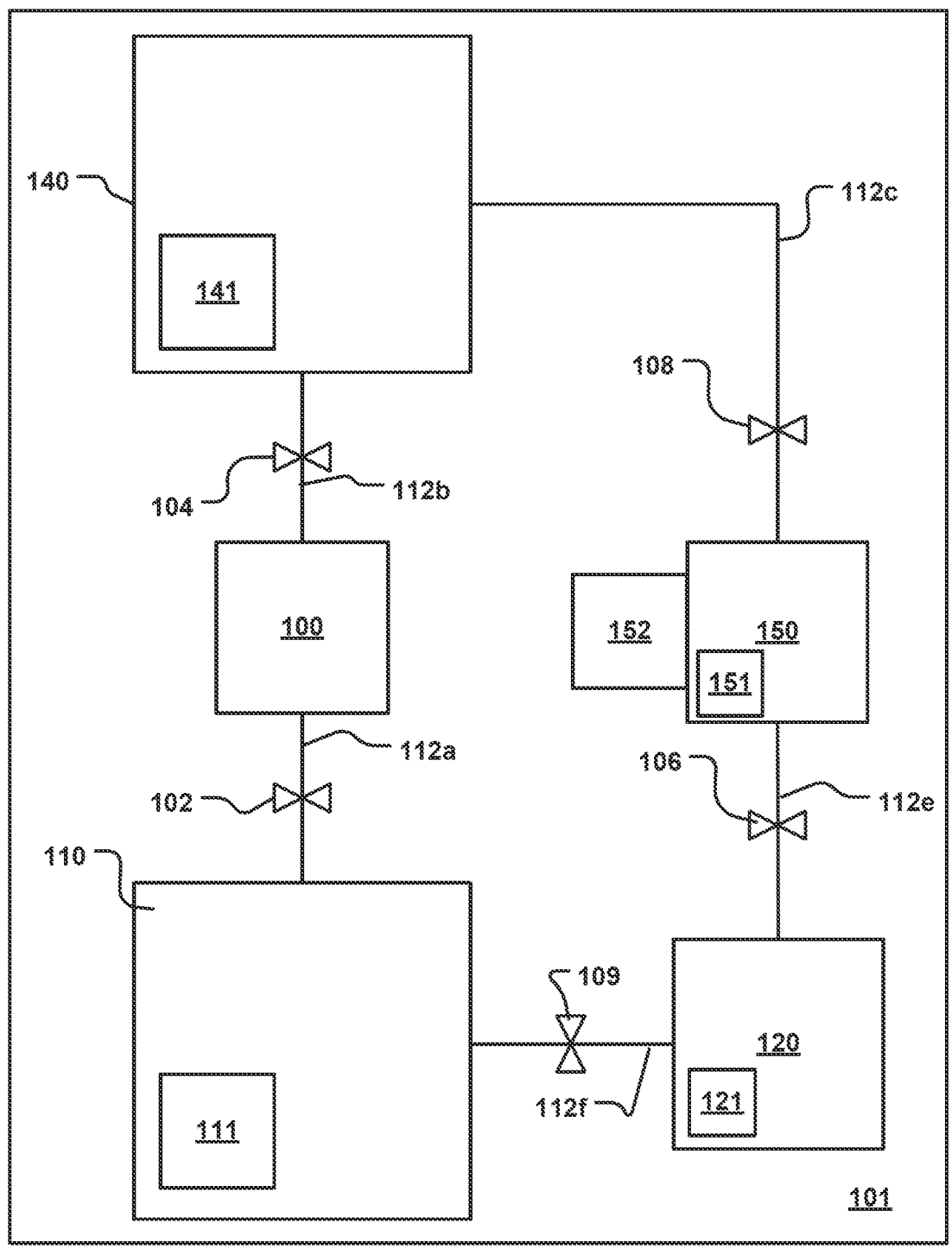
FIG. 1 is schematic view of a closed-loop extraction system.

Referring to FIG. 1, an example extraction system 101 includes a first tank 110 associated with a thermal element 111, an extraction system component 140 associated with a thermal element 141, an extraction column 100, a filter 150 associated with thermal element 151, and a collector 120 associated with thermal element 121. Filter 150 in this example system comprises a filter defining a mixture flow path in accordance with the above-described first aspect of the present invention. Solvent conduit 112a and valve 102 are arranged between first tank 110 and extraction column 100. Liquid mixture conduit 112b and valve 104 are arranged between extraction column 100 and extraction system component 140, before the mixture is directed to filter 150 via filter input conduit 112c through valve 108. Filtered solvent-extract mixture, that is a filtrate solvent-extract mixture, is directed to collector 120 through filter output conduit 112e and valve 106.

Component 140 may apply a suitable process to the solvent-extract mixture received from extraction column 100, including heating or cooling the mixture, via thermal element 141. The heating that may be performed at component 140 may cause a portion of solvent to evaporate from the solvent-extraction mixture, and this evaporated solvent may then be re-captured and re-directed to a solvent tank such as tank 110 after any further processing that may be necessary or desirable. Alternatively or additionally, the heating or cooling at component 140 may include thermally regulating the solvent-extract mixture to a pre-defined value for optimizing the downstream filtering processes and apparatus described herein. For example, component 140 may function to thermally regulate the solvent-extract mixture for ensuring a minimum or maximum viscosity of the solvent-extract mixture, among other possible optimizations for downstream filtering.

Additionally or alternatively, component 140 may mix further solvents (e.g., ethanol) for optimizing (or enabling) downstream filtering. The further solvents may alternatively be mixed upstream of or within extraction column 100.

The example extraction system shows a device 152 (for example, a displacement fluid tank, pump, or compressor) to induce the desired flow of solvent-extract mixture through filter 150 and a thermal element 151 for cooling or heating solvent-extract mixture within filter 150. Device 152 may alternatively or additionally be operable for moving or assisting in moving materials components residing within filter 150 before and/or after the solvent-extract mixture filtering process. Regardless of whether device 152 and/or thermal element 151 is included in the system or otherwise and regardless of how the solvent-extract mixture is cause to flow through filter 150, the filter can remove one or more of tars, tannins, waxes, chlorophyll, water, or some other component from the solvent-extract mixture. As noted above, and as described further below in connection with the example filter embodiments, filter 150 may employ any suitable filter medium or combination of such media and may, for example, minimize solvent loss (such as residual solvent that retained by filter 150). In one example, the average pore size of the filter material may decrease, in stages, as the solvent-extract mixture flows through filter 150.

After filtering through filter 150, a filtered solvent-extract mixture flows through a solvent-extract mixture outlet conduit 112e to extract collector 120. Extract collector 120 may be heated via thermal element 121 to, for example, evaporate a portion or practically all remaining solvent included in the filtered solvent-extract mixture. The evaporated solvent may be directed via solvent return line 112f and valve 109 and to tank 110 where it may be condensed if not condensed before entering tank 110.

Thermal elements 111, 121, 141, and 151 may be removably coupled and/or directly mechanically coupled to the exterior of its respective extraction system component. In one example, thermal elements 111, 121, 141, and 151 are fluid jackets that may be respectively welded or otherwise connected to the respective tank or component.

Thermal elements 111, 141, 121, and 151 may respectively heat and/or cool the fluid contents of their respective extraction system component in any suitable fashion. In some cases, thermal elements 111, 141, 121, and 151 may thermally drive a fluid from one extraction system component to another. In some embodiments, solvent and solvent-laden mixtures may be thermally driven through the entire fluid path of extraction system 101, including thermally driving a solvent-extract mixture through filter 150.

Additionally or alternatively, thermal elements 111, 141, 121, and 151 may thermally condition a fluid for optimizing a process of an extraction system component upon a fluid. For example, thermal elements 141, 121, and 151 may thermally condition a solvent-extract mixture before, while, and/or after the solvent-extract mixture flows through filter 150. According to such examples, one goal of thermally conditioning a solvent-extract mixture is to modify a characteristic of said mixture such as distillation during solvent recovery, to facilitate more efficient filtering, and/or to manipulate pressure differentials for thermally driving solvent or mixtures thereof within extraction system 101.

Figure 2:
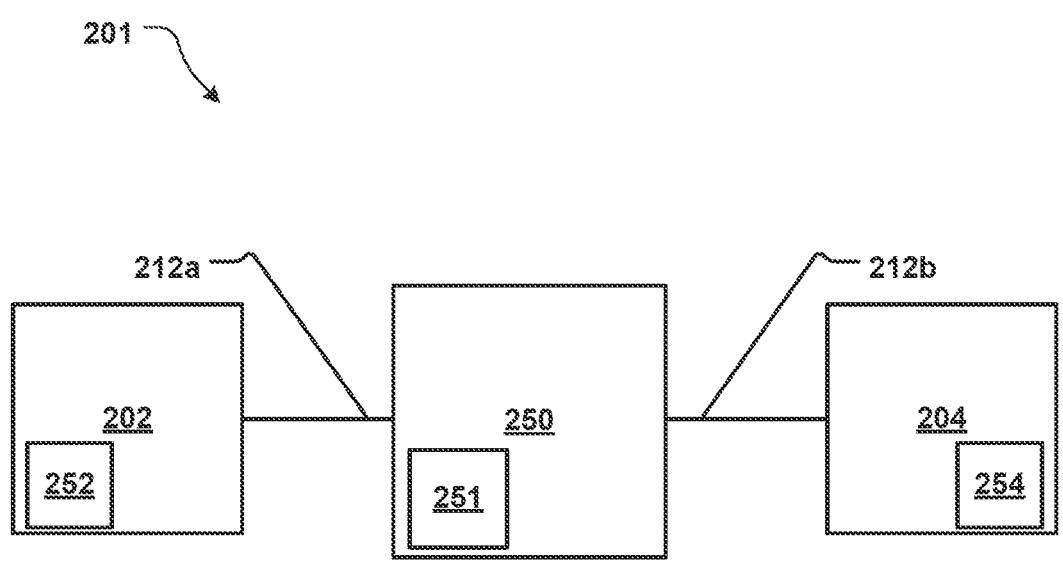
FIG. 2 is a schematic view of an extraction sub-system.

In FIG. 2, extraction sub-system 201 includes fluid source 252, thermally coupled to thermal element 251, filter 250, and filtered material collector 220. Similarly to filter 150 shown in FIG. 1, filter 250 comprises a filter in accordance with the above-described first aspect of the present invention. Fluid connectors such as valves are omitted in FIG. 2, but it will be appreciated by those skilled in the art that various valves and other flow control devices may be included in the sub-system for controlling the flow of materials from one component to the next.

Fluid source 252 may provide a fluid for purging, for example, residual solvent from the filter material within filter 250. Fluid source may provide a thermally regulated fluid, via fluid conduit 212a, that is either directly applied to the filter material of filter 250 (for example, a nitrogen gas or steam purge) or feeds thermal element 251 in fluid jacket embodiment example. That is, fluid source 252 may provide a thermally regulated fluid for a fluid jacket that is thermally coupled to filter 250 for heating, in some cases, the filter material to a solvent boiling point. Alternatively, thermal element 251 may be an electric thermal element such as an electric thermal jacket.

Regardless of the manner in which the filtered fluid is removed from the filter medium, a residual fluid flows via residual conduit 212b to filter residual collector 220, which may be thermally coupled to thermal element 221. The residual fluid flow may be thermally driven via temperature differentials between filter 250 and collector 220. Additionally or alternatively, pressure provided from source 202 and/or a fluidly-coupled pump may assist via positive or negative pressure in inducing or otherwise facilitating the flow of residual fluid from filter 250 and towards collector 220.

Figure 3:
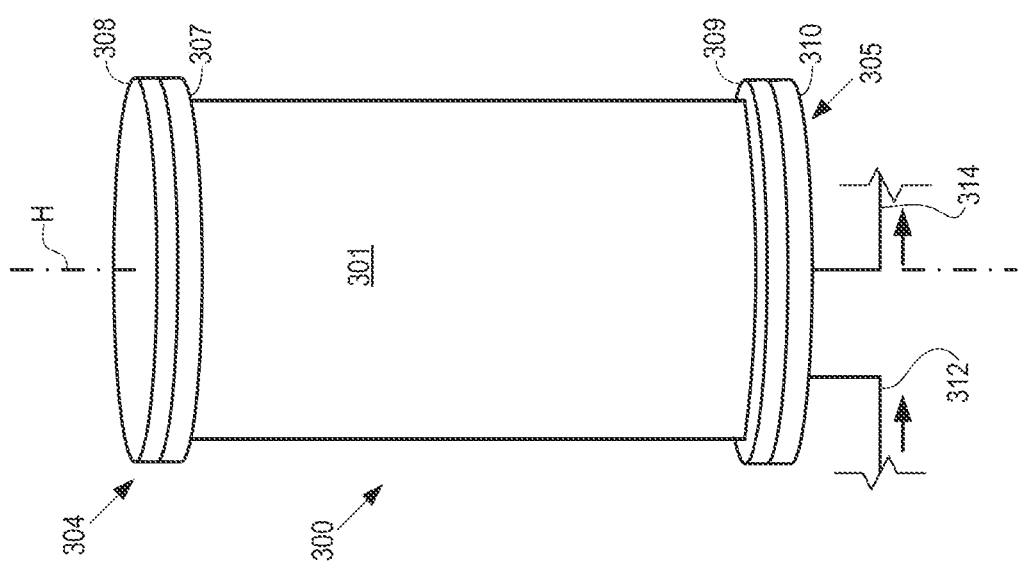
FIG. 3 is a somewhat schematic representation of a filter apparatus which may implement one or more aspects of the present invention.

FIG. 3 shows a filter apparatus which may be used as the filter 150 shown in FIG. 1 and filter 250 shown in FIG. 2. In the embodiment shown in FIG. 3, the filter apparatus includes an elongated housing 300 extending along housing longitudinal axis H and defined by a housing cylinder 301 closed at each end with a respective end component 304 and 305. The upper end component 304 shown in FIG. 3 comprises a disk-shaped cover 308 connected in an operating position on a flange 307 on housing cylinder 301. Similarly, lower end component 305 comprises a second disk-shaped cover 310 connected to a flange 309 on housing cylinder 301. The schematic view of FIG. 3 (and the side view in FIG. 4) does not include any illustration of means for connecting the respective flange 307, 309 and cover 308, 310. It will be appreciated that any suitable connecting structure may be employed to place the respective cover in its operating position on housing cylinder 301.

For example, each flange 307, 309 may be provided with corresponding bolt holes spaced apart about its circumference in position to align with corresponding bolt holes formed around the periphery of the respective cover 308, 310. In this arrangement, a suitable bolt may be installed across each corresponding set of bolt holes to secure the cover 308, 310 to the respective flange 307, 309. Alternatively, a clamp such as a circumferential clamp or a series of clamps spaced apart about the periphery of the respective flange 307, 309 and cover 308, 310 could be used to connect the two elements of the respective component, 304 and 305. Also, it will be appreciated that one or more sealing elements such as O-rings or other sealing features may be used to provide a suitable peripheral seal between the flange 307, 309 and respective cover 308, 310 regardless of how the two components are connected to form the respective end component 304, 305.

Figure 4:
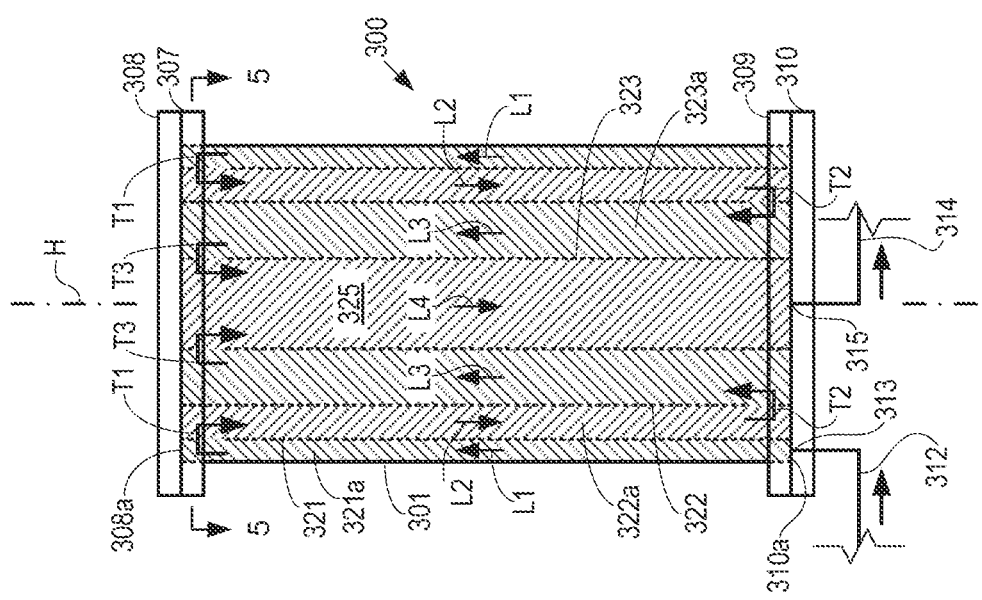
FIG. 4 is a somewhat schematic side view of the filter apparatus shown in FIG. 3 and showing internal elements of the apparatus in hidden lines.

As will be described further below in connection with the side view of FIG. 4, an inner surface of each end cover 308 and 310 in this embodiment together an inner surface of housing cylinder 310 define a housing volume through which the mixture flow path and filter medium receiving volumes described above in the summary section are formed. Material to be filtered may be directed to the housing volume through an inlet conduit 312 and exit the housing volume through an outlet conduit 314. As shown in FIG. 4 inlet conduit 312 connects to an inlet port 313 of the filter apparatus while outlet conduit 314 is connected to an outlet port 315 of the filter apparatus.

Figure 5:
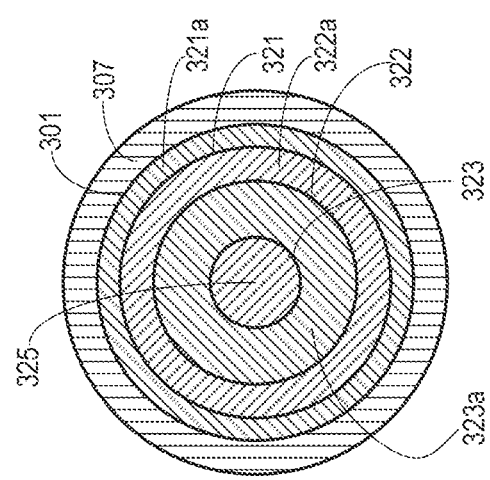
FIG. 5 is a somewhat schematic section view taken along line 5-5 in FIG. 4.

The side view of FIG. 4 and the transverse section view of FIG. 5 show that the example filter apparatus includes a number of inner cylinders in addition to housing cylinder 301. These inner cylinders function to help define the mixture flow path through housing 300 and a number of flow path sections which make up the flow path. The example of FIGS. 4 and 5 include in addition to housing cylinder 301 a first cylinder 321, a second cylinder 322, and a third inner cylinder 323. Housing cylinder 310 together with the inner cylinders 321, 322, and 323 produce a number of annular volumes within the housing volume, 321a, 322a, and 323a, respectively, with each annular volume defining filter medium receiving volume and a portion of the overall mixture flow path through housing 300. The innermost cylinder 323 forms a cylindrical volume 235 that is also part of the mixture flow path in this embodiment. The crosshatching in both FIGS. 4 and 5 (aside from the crosshatching through flange 307 in FIG. 5) indicate a respective filter medium received in a respective filter medium receiving volume included along the flow path.

FIG. 4 shows the directions of flow through housing 300 along the mixture flow path defined from inlet port 313 to outlet port 315. A fluid under a suitable motive force flows from inlet port 313 upwardly in the orientation of this figure along a first longitudinal path section through the first annular filter medium volume 321a defined between an inner surface of housing cylinder 301 and an outer surface of cylinder 321 as indicated by arrows L1. The fluid then flows through a transverse path section indicated by arrows T1 to the next annular filter medium receiving volume defined between an inner surface of cylinder 321 and an outer surface of cylinder 232, and then in the direction of arrows L2 downwardly in the orientation of figure along a second longitudinal path section through the annular filter medium receiving volume 322a.

The fluid being filtered next flows along a transverse path section indicated by arrows T2 to the next annular filter medium volume defined between an outside surface of cylinder 322 and an inside surface of cylinder 323. The fluid then flows in the direction indicated by arrows L3 along a third longitudinal path section of the overall mixture flow path. At the end of this flow path through filter medium receiving volume 323a, the fluid flows along a third transverse path section indicated by arrows T3 to reach the innermost filter medium receiving volume 325 in this example. The fluid flows along a fourth longitudinal path section through this volume 325 in the direction indicated by arrow L4 to reach outlet port 315 and outlet conduit 314.

It will be appreciated from FIG. 4 that a portion of each flow path in this particular embodiment is defined by a surface of the end covers 308, 310. Using the outermost annular filter medium receiving volumes 321a as an example, an annular surface 308a of end cover 308 forms an end surface of that respective annular filter medium receiving volume. Similarly, at the opposite end of filter medium receiving volume 321a an annular surface 310a of end cover 310 forms an end surface of the volume 321a.

Figure 6:
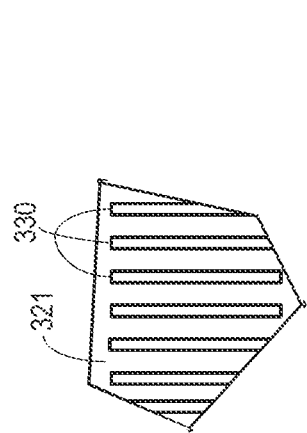
FIG. 6 is an enlarged plan view of a mixture flow path arrangement which may be employed between filter medium areas in the embodiment shown in FIG. 4.

Each of the inner cylinders in the embodiment shown in FIG. 4 includes an arrangement for allowing fluid to flow from one annular filter medium receiving volume along one of the transverse path sections T1, T2, and T3 to the next along the mixture flow path through the filter apparatus. Such an arrangement may include a number of apertures spaced apart suitably along the circumference of the wall of the respective cylinder 321, 322, and 323 at the end thereof at which the transverse flow is desired. FIG. 6 shows an example of suitable apertures in the wall of cylinder 321. These example apertures comprise a series of elongated slot-shaped openings 330 in the wall defining cylinder 321.

It will be appreciated that any suitable apertures may be used to allow fluid communication between the annular volumes, preferably around the entire circumference of the respective separating cylindrical wall. Other suitable apertures may comprise circular openings arranged in any suitable pattern. Also, although the example elongated slot-shaped openings 330 are shown in FIG. 6 as terminating before the end of the cylinder wall 321, other embodiments may include slots or other openings that extend to the end of the cylinder wall 321. More broadly, embodiments of a filter apparatus according to the present invention may include any apertures or any other arrangement to allow the desired transverse flow from one longitudinal flow path section to the next longitudinal flow path section along the mixture flow path.

It will be appreciated from FIG. 4 that each cylinder within housing 300 includes an end at which transverse flow in not desired. For example, the points at which cylinder 321 meets the inner surface of end cover 310 should allow substantially no flow from volume 321a to volume 322a. Blocking flow at these points may be accomplished in any suitable fashion. For example, a sealing element such as an O-ring or gasket (not shown due to the scale of the FIG. 4) may be positioned in a suitable manner between the end of wall 321 and the inner surface of end cover 310. In some embodiments the inner surface of end cover 310 may have machined therein a groove for receiving a sealing element such as an O-ring to provide a seal against the end of cylinder 321 and also provide a positioning feature for cylinder 321 (as will be described further below). Such a sealing arrangement or other sealing/positioning arrangement may be provided also in end cover 310 for the end of cylinder 323 and in end cover 308 for cylinder 322.

The embodiment shown in FIG. 7 may have an outward appearance similar to that shown in FIG. 3. In particular, the device shown the side view of FIG. 7 includes a housing 400 including a housing cylinder 401 and end components 404 and 405. End component 404 in this alternative embodiment includes a flange 407 and an end cover 408, while end component 405 includes a flange 409 and an end cover 410. Similarly to the embodiment shown in FIGS. 3-5, the embodiment shown in FIG. 7 includes three inner cylinders 421, 422, and 423 concentrically mounted within the volume defined by housing cylinder 401. Unlike the embodiment shown in FIGS. 3-5, end covers 408 and 4010 are formed to define a portion of the housing volume and portions of the overall mixture flow path through the housing. Thus in the example of FIG. 7, the transverse flow paths from one longitudinal flow path section to the next is through a volume defined within the respective end cover. In particular, the transverse flow path section indicated by arrows T4 in FIG. 7 is through a volume 441 defined within the upper end cover 408 between a surface 441a and ridge 441b machined or otherwise formed in the material comprising end cover 408. The transverse flow path section indicted by arrows T5 is through a volume 442 defined within a volume within the lower end cover 410 defined between an inner surface of ridge 447b and outer surface of ridge 450a. Similarly, the transverse flow path section indicated by arrows T6 is through a volume 443 defined within upper end cover 408 by the inner surface of ridge 441b.

It will be noted in FIG. 7 that the portions of the flow path in defined within the end covers 404 and 405 are shown as not including any filter medium or other material. Leaving these volumes as essentially open voids may be accomplished by positioning annular shaped screens at the end of each annular flow path section (or a disk-shaped screen at the upper end of cylinder 422 and at the lower end of cylinder 423). The example of FIG. 7 shows an annular screen 445 in the area between housing cylinder 401 and cylinder wall 422 at the upper end of the device. Annular screen 445 extends over the top of cylinder 421 to cover the entire annular area between housing cylinder wall 401 and cylinder 422 and thus separates the volume 441 from two adjacent filter medium receiving volumes 421a and 422a. A similar, but narrower in the horizontal direction, annular screen 446 at the lower end of the device separates filter medium receiving volume 421a from an annular volume 447 adjacent to inlet port 413 and defined between surface 447a and an inner surface of ridge 447b.

Annular screen 446 covers the area at the lower end of the filter medium receiving volume between housing cylinder 401 and cylinder 421. At the top of housing 400 a disk-shaped screen 448 extends across the area defined by the top of cylinder 422 in position to separate filter medium receiving areas 423a and 425 from volume 443 defined in end plate 408. At the bottom of housing 400 in the orientation of FIG. 7, and annular screen 449 extends between cylinder 421 and cylinder 423 to separate volume 442 from filter medium receiving volumes 422a and 423a, and a disk-shaped screen 450 is located over the area defined by the lower end of cylinder 423. The screen material in each case is highly permeable to the fluid to be filtered so as to allow the fluid to pass but to ensure filter medium is retained in the desired volumes within housing cylinder leaving the volumes defined in the end covers 408 and 410 unoccupied by filter medium. It should also be appreciated that the various screens shown in FIG. 7 are shown in a somewhat exaggerated scale vertically in the orientation of the drawing in order to call the screens out in the figure. The screens may in fact be very thin in the vertical direction on the order of a millimeter or less.

It should be noted here that the flow in the desired transverse path sections as indicated by arrows T4, T5, and T6 may be ensured by providing an appropriate seal at locations between the respective end cover and the longitudinal flow path section defining cylinders. In particular, the example of FIG. 7 has a substantial seal (under the desired operating parameters and considering the fluid to be filtered) between the end of ridge 441b and the upper end of cylinder

422. A substantial seal is also employed between the end of ridge 447b in end cover 410 and the lower end of cylinder 421 and between the end of ridge 450a and the lower end of cylinder 423. These seals may be provided in any suitable manner as discussed above in connect with FIG. 4.

As an alternative to the screens shown in FIG. 7, and suitable unreactive (to the fluid to be filtered) and highly permeable material may be positioned in the various volumes defined in the end covers 408 and 410. A suitable stainless steel wool material or fibrous or perhaps sintered metal or plastic material, or a highly permeable ceramic material may be used to fill the volumes formed in end covers 408 and 410 either with or without the illustrated annular and disk-shaped screens, all for the purpose of leaving those volumes essentially unfilled with filter medium.

In order to support the inner cylinders 421, 422, and 423 in the desired longitudinal position within housing cylinder 401 shown in FIG. 7, the end covers 408 and 410 may include a number of supports spaced apart along a circumference in the respective end cover that corresponds with the circumference of the aligned cylinder. In the example of FIG. 7, such supports may be used in the upper end cover 408 to support the upper end of cylinder 421 and the innermost cylinder 423. The lower end cover 410 may include supports for longitudinally supporting the lower end of cylinder 422. The section view of FIG. 8 shows an example configuration of such supports in end cover 408 in addition to and outer surface 460 of the end cover, the wall of housing cylinder 401, and ridge 441b separating end cover volumes 441 and 443.

In this example the longitudinal support for cylinder 421 twelve ridges 461 spaced apart along a circular shape corresponding to the circular shape of the upper end of cylinder 421 (FIG. 7). Thus the ridges 461 are in position to substantially abut the end of cylinder 421 when the end cover 408 is in the operating position shown in FIG. 7, but the gaps between the ridges 461 allow fluid to flow in the direction of arrows T4 in FIG. 7. End cover 408 also includes a support made up of four ridges 462 spaced apart along a circular shape corresponding to the circular shape of the upper end of cylinder 423. These four ridges 462 are thus positioned to abut the upper end of cylinder 423 when end cover 408 is in the operating position shown in FIG. 7, while still allowing the flow of fluid in the direction indicated by arrows T6 in FIG. 7. The section view of FIG. 9 is taken along a line that shows how support ridges 461 in this example extend substantially to the level 464 of a lowermost edge of end cover 408 in position to abut the upper end of cylinder 421 when the end cover is connected in the operating position shown in FIG. 7.

It will be appreciated that although the example of FIG. 8 shows a total of twelve spaced-apart support ridges 461, other arrangements of support ridges may be used. As few as three support ridges 461 spaced apart equally along the circular shape may be employed to provide the desired longitudinal positioning support for the upper end of cylinder 421. A similar supporting ridge arrangement may be used in the lower end cover to support the lower end of cylinder 422.

Figure 10:
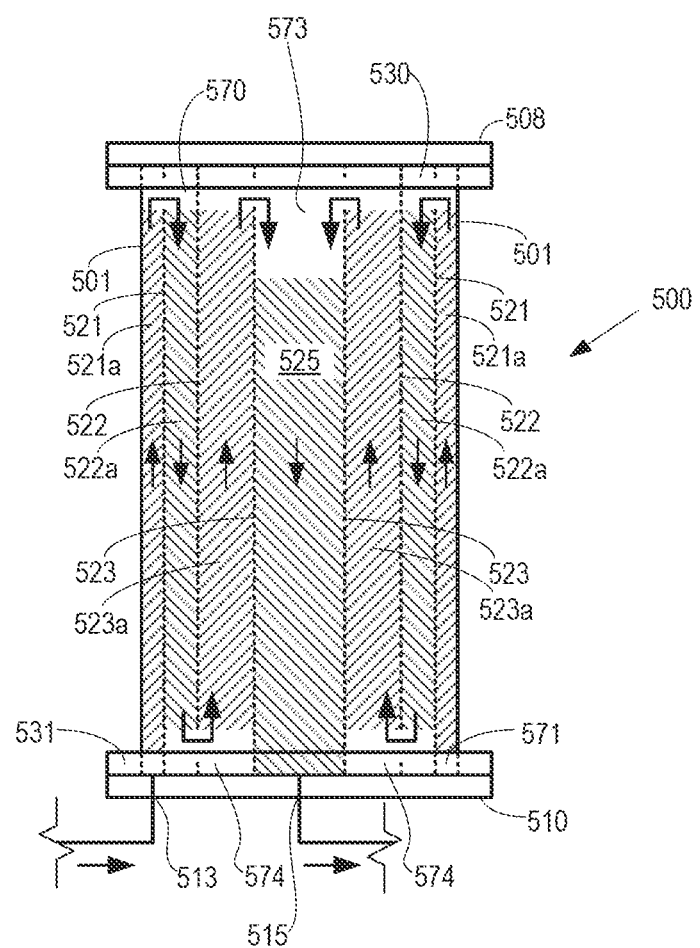
FIG. 10 is a somewhat schematic side view similar to FIG. 4 but showing an alternate arrangement of internal elements for the filter apparatus.

FIG. 10 shows another example embodiment of a filter apparatus in accordance with aspects of the invention having an outward appearance similar to that shown in FIG. 3. The example of FIG. 10 is similar to that shown in FIG. 4 in that none of the mixture flow path through the housing 500 is defined within either of the device end covers 508 and 510. Unlike the embodiment shown in FIG. 4, the filter medium receiving volumes defined along the mixture flow path do not extend the entire length of the housing cylinder 501. In particular, the filter medium receiving volumes 521a and 522a leave an annular volume 570 at the top of the housing 500 and the filter medium receiving volume 521a leaves an annular volume 571 at the bottom of housing 500 adjacent to inlet port 513 from inlet conduit 512.

Filter medium receiving volumes 522a and 525 leave a volume 573 at the top of housing 500, while filter medium receiving volumes 522a and 523a leave an annular volume 574 at the bottom of housing 500. In the example of FIG. 10, no open volume is provided adjacent to outlet port 515, but a suitable volume could be formed here as well at the bottom of filter medium receiving volume 525. Each of the volumes maintained in housing 500 such as volumes 570, 571, 573, and 574 may be maintained free of filter medium in any suitable fashion such as with screens and/or suitable fill material that is suitably permeable and unreactive to the fluid to be filtered in the filter apparatus.

The volume of filter material included in each filter material receiving volume may be selected according to the filtering requirements expected for a given type and volume of fluid to be filtered. In some cases, it may be desirable to include the same volume of filter material in each of the different filter medium receiving volumes. In such cases, the size of the different cylinders (for example, 321, 322, and 323 in FIG. 4) may be selected and/or volumes such as 570, 571, 573, and 574 may be selected to provide the same volume of filter material along each flow path section. The inner cylinders and open volumes may also be selected to provide different filter medium volumes along different flow path sections. Filter media of different characteristics or entirely different filter types of filter medium may be used in the different flow path sections within the filter housing (such as 300 in FIG. 4). Dissimilarities in filter media may include different filter medium characteristics and/or different filter media used at different locations in the same filter medium receiving volume in a filter apparatus as described herein. In another example, the average pore size of the filter material may decrease, in stages that are defined by respective filter medium receiving volumes, as the solvent-extract mixture flows from inlet port 313 to outlet port 315.

Regardless of what type or types of filter media are used in a given application of a filter apparatus in accordance with the present invention, the filter media may be placed in the various filter medium receiving volumes in any suitable manner. Where a given filter medium is in particulate form, for example, the housing cylinder may be positioned as shown in FIG. 4 for example with the upper end cover 308 removed, and the particular matter filter medium may be poured into the desired annular volume. Filter medium may also be preformed into a desired annular or cylindrical shape and the preformed volume of filter medium slid into the desired location within the housing volume. Also, spent filter medium may be removed from the filter apparatus in any suitable fashion. For example, both end covers (such as 308 and 310 in FIG. 4) may be removed and a suitable press may be used to longitudinally press out one or more of the inner cylinders and the filter medium located therebetween.

Implementations of a filter apparatus according to the present invention may include suitable features for maintaining the different inner cylinders in the desired parallel arrangement as the filter apparatus is filled with filter medium and during a filtering operation. For example, spacer elements may be included in each annular area at two spaced apart points along the length of a given cylinder and around the circumference of the given cylinder to ensure the desired spacing with the next larger cylinder. Alternatively or in addition to a spacer element arrangement, one or both end covers may include features for receiving an end of a given cylinder to maintain that cylinder end in a desired position relative to the other cylinders.

The various components of a filter apparatus according to the present invention may be formed from any suitable material or combination of materials. The materials should be selected for compatibility with the fluid to be filtered and with the expected operating parameters including temperature and pressure. For example, housing 300 shown in FIG. 3 and the inner cylinders 321, 322, and 323 shown in FIG. 4 for example may be formed from a suitable stainless steel. In some cases, plastics such as PEEK may also be used for one or more of the components.

Figure 11:
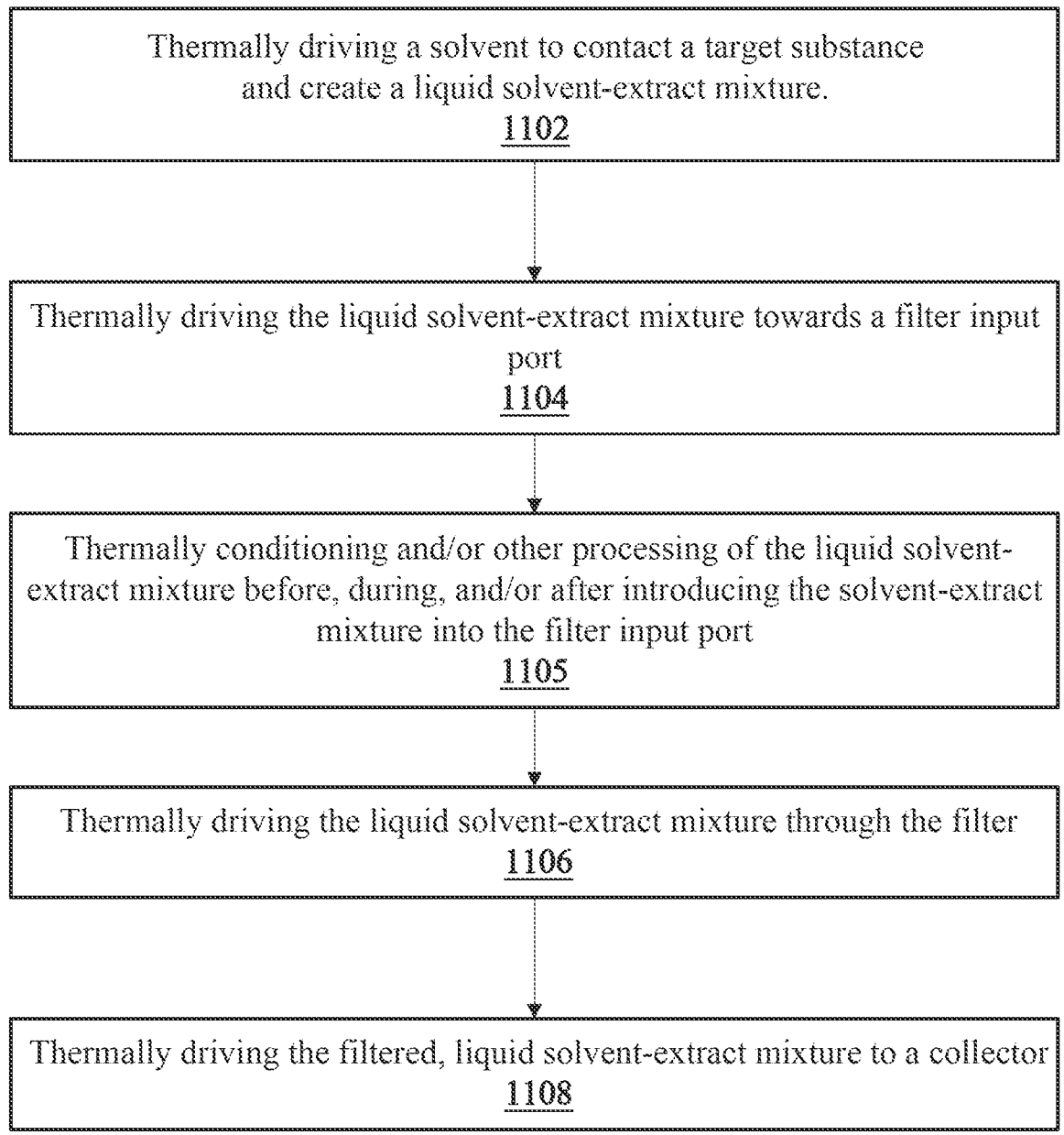
FIG. 11 shows a method that includes filtering a solvent-extract mixture.

FIG. 11 shows a method that includes filtering a liquid solvent-extract mixture. Step 1102 includes thermally driving a solvent to contact a target substance that is contained within an extraction column and thereby create, typically in liquid-solvent extraction embodiments, a liquid solvent-extract mixture. Step 1104 includes thermally driving the liquid solvent-extract mixture towards the input port of a filter which may comprise a filter apparatus in accordance with the present invention as described above. The thermal driving step 1104 may drive the liquid solvent-extract mixture directly from the extraction column or directly from some intermediate processing element interposed between an output of the extraction column and the input port of the filter apparatus.

As indicated at step 1105 in FIG. 11, thermal conditioning and/or other processing steps may be included before, during, and/or after introducing the liquid solvent-extract mixture into the filter input port and thus mixture may be contained in one or more intermediary extraction system components before or after the filter apparatus. Such processing may include thermally conditioning the liquid solvent-extract mixture to reach and/or maintain a target temperature that optimizes a process (e.g., filtration) of a downstream extraction system component.

Step 1106 in FIG. 11 includes thermally driving the liquid solvent-extract mixture through the filter. Step 1108 includes thermally driving the filtered solvent-extract mixture to a collector. A collector may further process the filtered, liquid solvent-extract mixture, including distilling most if not practically all solvent (below a certain threshold) out of the solvent-extract mixture, thereby providing a pure, safe extract. The collector may be fluidly coupled to a cooled solvent tank for recycling the distilled solvent. The method may move solvent and mixtures thereof entirely by "pumpless" techniques, including establishing thermal differentials between extraction system components. Of course, filter apparatuses and filtering processes in accordance with aspects of the present invention are not limited to any particular technique for driving a solvent-extract mixture through the filter.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

As a further example, the thermally driving steps of 1104, 1006, and 1108 are shown as discrete steps as both a possible embodiment and for didactic purposes. In fact, said thermal-driving steps may be accomplished by a single, continuous thermal differential that is established between two extraction system components (e.g., tanks) such that the liquid solvent-extract mixture in two or more steps of 1104, 1006, and 1108 is "flowing" from one step to another without a discrete demarcation such as stopping the flow of said mixture or modifying the thermal differential between steps.

The invention claimed is:

1. A filter apparatus for filtering a solvent-extract mixture, the filter apparatus including:
   (a) an elongated housing defining a housing longitudinal axis;
   (b) a filter input port to the housing and a filter output port from the housing;
   (c) a mixture flow path defined within the housing and extending from the filter input port to the filter output port, the filter input port being in fluid communication with the output port through the mixture flow path;
   (d) two or more filter medium receiving volumes defined along the mixture flow path, each filter medium receiving volume configured to receive a filter medium and contain the filter medium in the respective filter medium receiving volume, wherein a total length of the filter medium receiving volumes along the housing longitudinal axis is longer than the length of the housing along the housing longitudinal axis; and (e) first and second removeable end covers arranged at first and second opposite ends of the housing when placed in respective operating positions at the first and second ends of the housing.

2. The filter apparatus of claim 1 wherein:

(a) the filter medium receiving volumes define a number of longitudinal path sections of the mixture flow path with a first longitudinal path section defining a first flow direction along the housing longitudinal axis from the filter input port and with a second longitudinal path section defining a second flow direction along the housing longitudinal axis that is opposite to the first flow direction; and (b) the mixture flow path includes at least two transverse path sections that are each oriented transversely to the housing longitudinal axis.

3. The filter apparatus of claim 2 wherein at least one of the first and second removeable end covers define at least a portion of one of the at least two transverse path sections.

4. The filter apparatus of claim 2 wherein at least some of the number of longitudinal path sections of the mixture flow path extend parallel to the housing longitudinal axis.

5. The filter apparatus of claim 4 wherein the first longitudinal path section of the mixture flow path is defined at least in part along an external surface of a first hollow cylinder concentrically positioned within the housing and extending parallel to the housing longitudinal axis.

6. The filter apparatus of claim 5 wherein the second longitudinal path section is defined at least in part along an internal surface of the first hollow cylinder.

7. The filter apparatus of claim 5 wherein the first hollow cylinder includes an aperture at a longitudinal end thereof defining at least a portion of one of the at least two transverse path sections.

8. The filter apparatus of claim 5 further including at least one additional hollow cylinder concentrically positioned within the housing and extending parallel to the housing longitudinal axis and cooperating with the first hollow cylinder to define one of the longitudinal path sections.

9. The filter apparatus of claim 4 wherein the first and second removeable end covers, when placed in the respective operating positions, each at least define an end surface of the first longitudinal path section and an end surface of the second longitudinal path section.

10. The filter apparatus of claim 4 wherein the first and second removeable end covers, when placed in the respective operating positions, each defining respective end surfaces of the number of longitudinal path sections.

11. The filter apparatus of claim 4 wherein the first and second removeable end covers, when placed in the respective operating positions, cumulatively define all end surfaces of the number of longitudinal path sections.

12. The filter apparatus of claim 2 wherein the first and second removeable end covers each define at least a respective portion of one of the at least two transverse path sections.

13. The filter apparatus of claim 2 wherein the first and second removeable end covers each substantially define at least a respective volume of the at least two transverse path sections.

14. The filter apparatus of claim 2 wherein the first and second removeable end covers each define at least a respective volume of the at least two transverse path sections.

15. The filter apparatus of claim 1 further including at least one thermal element that is thermally coupled to at least one of the filter medium receiving volumes.

16. The filter apparatus of claim 1 wherein the two or more filter medium receiving volumes include a first filter medium receiving volume and a second filter medium receiving volume and wherein a first filter medium is positioned in the first filter medium volume and a second filter medium is positioned in the second filter medium volume, the first filter medium being dissimilar to the second filter medium.

17. The filter apparatus of claim 1 wherein the first and second removeable end covers are respectively an upper end cover and a lower end cover.

\* \* \* \* \*